United States Patent [19]
Genise

[11] Patent Number: 6,052,638
[45] Date of Patent: *Apr. 18, 2000

[54] ENGINE FLYWHEEL TORQUE CONTROL

[75] Inventor: Thomas A. Genise, Dearborn, Mich.

[73] Assignee: Eaton Corporation, Cleveland, Ohio

[*] Notice: This patent is subject to a terminal disclaimer.

[21] Appl. No.: 09/026,777

[22] Filed: Feb. 20, 1998

[51] Int. Cl.$^7$ .................................................. G06F 19/00
[52] U.S. Cl. .................. 701/53; 701/84; 701/87; 701/90; 701/54; 477/78
[58] Field of Search ................. 701/53, 84, 87, 701/90, 54; 477/78

[56] References Cited

U.S. PATENT DOCUMENTS

| 4,361,060 | 11/1982 | Smyth | 74/866 |
|---|---|---|---|
| 4,595,986 | 6/1986 | Daubenspeck et al. | 364/424.1 |
| 5,305,213 | 4/1994 | Boardman et al. | 364/424.1 |
| 5,509,867 | 4/1996 | Genise | 477/120 |
| 5,582,069 | 12/1996 | Genise | 74/335 |
| 5,582,558 | 12/1996 | Palmeri et al. | 477/102 |
| 5,620,392 | 4/1997 | Genise | 477/120 |
| 5,679,096 | 10/1997 | Stine et al. | 477/111 |
| 5,797,110 | 8/1998 | Braun et al. | 701/84 |

FOREIGN PATENT DOCUMENTS

| 0512726 | 11/1992 | European Pat. Off. . |
|---|---|---|
| 0683335 | 11/1995 | European Pat. Off. . |
| 0800950 | 10/1997 | European Pat. Off. . |
| 0833042 | 4/1998 | European Pat. Off. . |
| 3735246 | 5/1988 | Germany . |

*Primary Examiner*—William A. Cuchlinski, Jr.
*Assistant Examiner*—Arthur D. Donnelly
*Attorney, Agent, or Firm*—Howard D. Gordon

[57] ABSTRACT

A control system/method for controlling engine (12) flywheel ($T_{FW}$) torque in a vehicular powertrain system (10) including an electronically controlled engine and a torque load limited drivetrain system (11) is provided. The control will sense values of a control parameter (GR, OS) indicative of potential overloading of the drivetrain at maximum engine flywheel torque and will cause engine flywheel torque to be limited to a value less than the maximum value thereof. Flywheel torque is determined as a function of torque values available on the vehicle electronic data link (DL).

7 Claims, 2 Drawing Sheets

ENGINE FLYWHEEL TORQUE CONTROL

RELATED APPLICATIONS

This application is related to copending, allowed U.S. Ser. No. 08/560,458, entitled POWERTRAIN TORQUE CONTROL and assigned to EATON CORPORATION, the assignee of this application.

BACKGROUND OF THE INVENTION

1. Field of the Invention

The present invention relates to a control system/method for limiting the torque applied to vehicular drivelines. In particular, the present invention relates to controls for vehicular powertrains including an electronically controlled engine and a drivetrain having a limited torque transfer capacity wherein the value of a control parameter indicative of operating conditions at which potentially undesirably high torque loads in the drivetrain may occur (for example, engaged gear ratio and/or vehicle speed) are monitored and engine output (flywheel) torque is limited during the occurrence of potentially undesirably high driveline torque loading operating conditions. More particularly, the present invention relates to controls for controlling engine flywheel torque to protect the vehicle drivetrain while allowing other engine torque parameters, such as accessory torque, to assume necessary values.

2. Description of the Prior Art

Vehicular powertrains for vehicles including fuel-controlled engines, such as diesel engines, and drivetrains including a multiple-speed, change-gear transmission and a drive axle, are well known in the prior art. Examples of such vehicular powertrains and components thereof may be seen by reference to U.S. Pat. Nos. 3,105,395; 3,448,635; 4,361,060; 4,977,972; 4,595,986; 5,033,795 and 5,305,213, the disclosures of which are incorporated herein by reference.

Electronically controlled engines which include an engine microprocessor control and which communicate with other vehicle systems or controllers, such as the transmission controller, over electronic data links are also known in the prior art. Typically, the engine controller and data link operate in accordance with an industry standard protocol, such as SAE J-1922, SAE J-1939, ISO 11898 or the like.

Prior art powertrain systems were not totally satisfactory, as, if sized to handle the maximum torque loading at low-speed operation, they were oversized for the majority of operating conditions and, if sized to handle the normally expected torque loads, were subject to damage at low-speed operation where the engine may generate a maximum or "burst" torque output.

Control systems which controlled an engine torque value, often a gross engine torque value, to protect the vehicle driveline are known in the prior art, as may be seen in U.S. Pat. No. 5,679,096 and aforementioned allowed, copending U.S. Ser. No. 08/560,458, the disclosures of which are incorporated herein by reference.

These prior art engine torque control systems were not satisfactory, as a control parameter other than flywheel torque (such as gross engine torque) was controlled, which might needlessly limit the ability of the engine to generate torque to drive accessories and/or torque to overcome engine friction.

SUMMARY OF THE INVENTION

In accordance with the present invention, the drawbacks of the prior art are minimized by the provision of a powertrain control which monitors the value of one or more control parameters and compares that value or values to a reference or references selected to be indicative of the existence of potentially undesirably high drivetrain torque loading. If potentially undesirably high drivetrain torque loading operating conditions are determined to exist, the torque output of the engine, specifically, the torque at the engine flywheel (i.e., "engine flywheel torque"), is limited to a value less than the maximum torque output thereof. Preferably, the engine is an electronically controlled engine communicating with an electronic data link using an industry standard protocol, such as SAE J-1922, SAE J-1939, ISO 11898 or the like, having one or more torque-limiting control modes.

As is well known in the industry, and as specified in the listed industry standard protocols, electronic engines are typically operable under four modes of operation, one of which is a torque-limiting mode wherein the engine ECU receives a command over a data bus setting forth a maximum gross engine torque. While limiting gross engine torque ($T_{EG}$) will protect the driveline, it also will tend to unnecessarily limit the torque available to overcome engine friction and/or to power engine-driven accessories. By limiting engine flywheel torque ($T_{FW}$), the driveline may be protected without these drawbacks.

Accordingly, it is an object of the present invention to provide a new and improved vehicular powertrain control method/system which will limit engine flywheel torque during operating conditions, such as low transmission gear and/or low vehicle speed conditions, wherein full flywheel engine output torque could result in undesirably high drivetrain torque loading, while not otherwise limiting the engine's ability to generate torque for overcoming engine friction and/or driving engine-driven accessories.

This and other objects and advantages of the present invention will become apparent from a reading of the detailed description of the preferred embodiment taken in connection with the attached drawings.

DESCRIPTION OF THE PREFERRED EMBODIMENT

Figure 1:
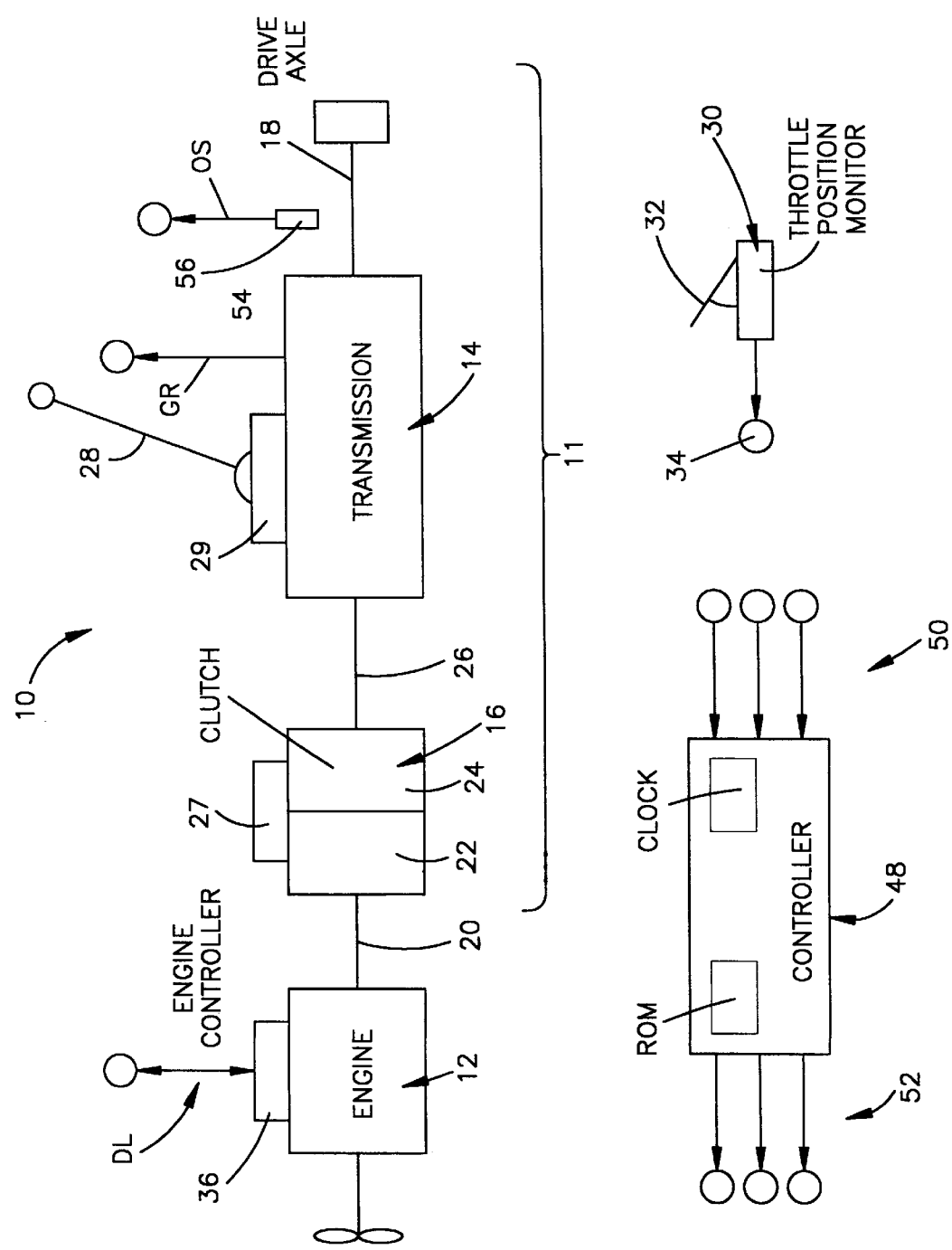
FIG. 1 is a schematic illustration of a vehicular powertrain system utilizing the present invention.

A typical vehicular powertrain 10 for a land vehicle, such as a heavy-duty truck, is schematically illustrated in FIG. 1. Powertrain 10 includes a drivetrain 11 driven by a prime mover 12, such as a well-known diesel engine. The drivetrain 11 includes a multiple-speed, change-gear transmission 14 connected to the engine 12 by a normally engaged master clutch 16 and having an output shaft 18 connected to a final drive 19, such as a transfer case and/or a drive axle. The crankshaft 20 of engine 12 drives the input elements 22 of clutch 16, which are frictionally engageable to and disengageable from output elements 24, which are fixed to the transmission input shaft 26. A manual or automatic control 27 controls the engagement and disengagement of clutch 26. Transmission 14 is preferably a 7-to-18-forward-speed transmission and may be controlled by a manual shift lever 28 acting on a shift bar housing or shift shaft mechanism 29.

A throttle pedal monitor assembly 30 monitors the position or displacement of the throttle pedal 32 and provides an output signal 34 indicative thereof. The engine 12 includes a controller, preferably a microprocessor-based controller 36, which communicates over an electronic data link DL and is effective to fuel the engine in accordance with commands over the data link. Typically, commands will request fueling to match operator throttle settings or to achieve a required engine speed and/or to provide a maximum output (i.e., flywheel) torque.

A microprocessor-based system controller 48 receives input signals, such as signal 34 from the throttle pedal sensor, signal GR from the engaged gear ratio sensor 54 and/or signal OS from the output shaft rotational speed sensor 56, and processes same according to predetermined logic rules to issue command output signals 52, including signals on the data link DL to the engine controller 36.

Assuming the drivetrain 11 is configured and sized to handle a torque load less than the maximum possible torque load at low transmission ratios and maximum (burst) engine output torques, some protection for the driveline should be provided.

To provide a drivetrain which is economically sized while providing protection thereof under possible unusual, extraordinarily high torque loading operating conditions, a control parameter (such as engaged transmission gear ratio (GR) and/or vehicle speed (sensed as output shaft speed OS)) is sensed and compared to a reference value indicative of the value of the control parameter at potentially damaging high driveline torque operating conditions.

By way of example, if the engaged ratio is not greater than low gear and/or if vehicle speed is not greater than 4 mph, then engine output torque should be limited to less than maximum burst output torque to protect the vehicle drivetrain.

The limits on engine output torque may vary with the value of the control parameter. For example, assuming an engine burst output torque of 150% of rated output torque, at engagement of a deep reduction ratio (such as greater than 12:1), maximum engine output torque might be limited to 100% of rated output torque, while engagement of about a 10:1 reduction ratio will require that maximum engine output torque be limited to 120% of rated output torque, and engagement of a ratio having a reduction of less than 10:1 will not require any limitation on engine output torque.

Figure 2:
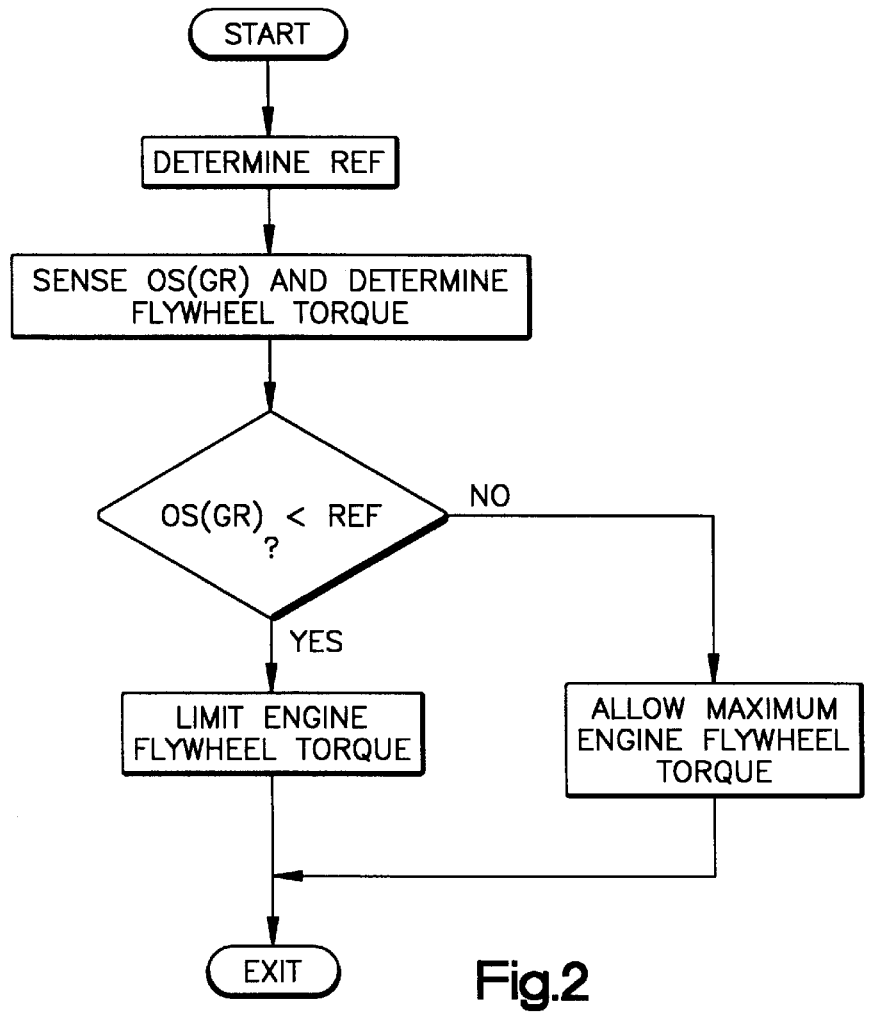
FIG. 2 is a schematic illustration, in flow chart format, of the present invention.
Figure 3:
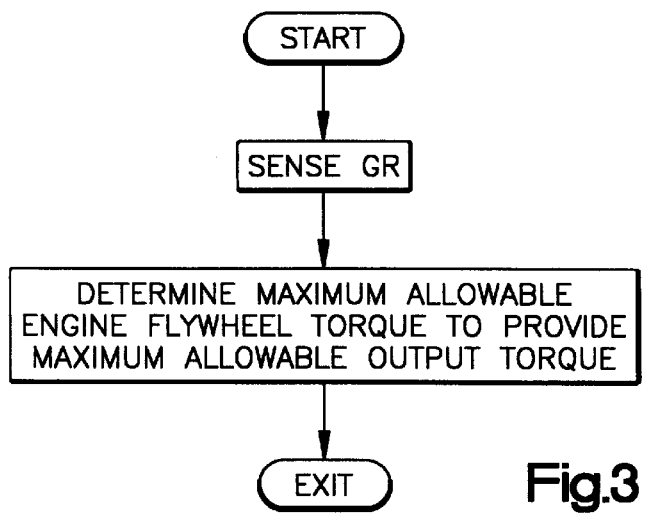
FIG. 3 is a schematic illustration, in flow chart format, of a further embodiment of the present invention.

FIG. 2 is a flow chart representation of the control method/system of the present invention.

Similar systems may be seen by reference to U.S. Pat. No. 5,679,096, the disclosure of which is incorporated herein by reference.

Preferably, the vehicle is equipped with an electronic data link of the type conforming to an industry standard protocol such as SAE J-1922 or J-1939.

As may be seen by reference to U.S. Pat. Nos. 5,509,867; 5,582,069; 5,620,392 and 5,620,558, the disclosures of which are incorporated herein by reference, in such vehicles, a value equal to or approximating engine flywheel torque ($T_{FW}$) may be determined. Such a determination may be made by using the relationship that $$T_{EG}=T_{FW}+T_{BEF}+T_{ACCES}+T_{ACCEL}$$

where:

$T_{EG}$=gross engine torque;

$T_{FW}$=engine flyweel torque;

$T_{BEF}$=base engine friction torque (includes the torque to overcome engine internal friction and the torque to rotate the engine manufacturer-installed accessories (i.e., water pump, oil pump, etc.));

$T_{ACCES}$=accessory torque (torque to operate vehicle accessories, such as air-conditioning, fans, lights, etc.); and $T_{ACCEL}$=torque to accelerate engine, calculated from engine acceleration or deceleration and moment of inertia (I) of engine.

Instantaneous values representative of gross engine torque ($T_{EG}$) and base engine friction torque ($T_{BEF}$) are available on the data link. $T_{ACCEL}$ is determined from sensed engien acceleration (which may be negative) and a calibrated moment of inertia (I) of the engine. Accessory torque ($T_{ACCES}$) is a constantly determined value which may be taken as net engine torque (i.e., $T_{EG}-T_{BEF}$) if the vehicle is idling with the transmission in neutral and is related to engine deceleration rate in a known, substantially linear manner when the vehicle is in motion.

Accordingly, an adaptive control system/method for a vehicular mechanical transmission system is provided which continuously updates the value of a control parameter ($T_{FW}$) indicative of flywheel torque.

As flywheel torque ($T_{FW}$) may be determined, this is the value, not gross engine torque, which should be controlled to protect the vehicle powertrain while not unnecessarily limiting the ability of the engine to power engine-driven accessories, overcome engine friction and the like. This is an especially important consideration for good low-speed vehicle operation, where much engine torque goes to accelerate the engine.

Although the present invention has been described with a certain degree of particularity, it is understood that various modifications are possible without departing from the spirit and the scope of the invention as hereinafter claimed.

I claim:

1. A method for controlling a vehicular powertrain system (10) comprising a fuel-controlled engine (12) drivingly connected to a vehicular drivetrain system (11) including a multiple-ratio, change-gear transmission (14) and a drive axle (19), said engine having a maximum output torque and an engine controller responsive to command signals to control fueling of the engine and, in at least one mode of operation, effective to limit gross engine torque, said drivetrain having a predetermined maximum torque loading capacity, said drivetrain configured such that an expected torque loading on said drivetrain under a predetermined set of drivetrain operating conditions defined by an engine output torque equal to or less than said maximum engine torque and transmission engaged ratio will exceed said predetermined maximum torque loading capacity, said method comprising:

determining as a function of gross engine torque a value of a control parameter indicative of engine flywheel torque;

sensing the value of a control parameter indicative of transmission engaged ratio; and causing said engine controller to limit gross engine torque to a value corresponding to an engine flywheel torque value determined as a function of transmission engaged gear ratio.

2. The method of claim 1 wherein said engine controller is microprocessor-based and communicates over an electronic data link.

3. The method of claim 1 wherein said transmission is manually shifted.

4. The method of claim 2 wherein said transmission is manually shifted.

5. A system for controlling a vehicular powertrain system (10) comprising a fuel-controlled engine (12) drivingly connected to a vehicular drivetrain system (11) including a multiple-ratio, change-gear transmission (14) and a drive axle (19), said engine having a maximum flywheel torque and an engine controller responsive to command signals to control fueling of the engine and, in at least one mode of operation, effective to limit gross engine torque, said drivetrain having a predetermined maximum torque loading capacity, said drivetrain configured such that an expected torque loading on said drivetrain under a predetermined set of drivetrain operating conditions defined by transmission engaged gear ratio and an engine torque less than or equal to said maximum engine output torque will exceed said predetermined maximum torque loading capacity, said system comprising:

means to determine as a variable function of gross engine torque the value of a control parameter indicative of current engine flywheel torque ($T_{FW}$);

means for sensing the value of a control parameter indicative of transmission engaged ratio; and means for causing said engine controller to limit engine flywheel torque by limiting gross engine torque to an engine flywheel torque value determined as a function of transmission engaged ratio.

6. The system of claim 5 wherein said engine controller is microprocessor-based and communicates over an electronic data link.

7. The system of claim 5 wherein said transmission is manually shifted.

* * * * *